US012050681B2

(12) United States Patent
Gupta

(10) Patent No.: US 12,050,681 B2
(45) Date of Patent: Jul. 30, 2024

(54) SOFTWARE BUILD SYSTEM PROTECTION ENGINE

(71) Applicant: Virsec Systems, Inc., San Jose, CA (US)

(72) Inventor: Satya V. Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 264 days.

(21) Appl. No.: 17/644,706

(22) Filed: Dec. 16, 2021

(65) Prior Publication Data

US 2022/0188408 A1 Jun. 16, 2022

Related U.S. Application Data

(60) Provisional application No. 63/126,515, filed on Dec. 16, 2020.

(51) Int. Cl.
| | | |
|---|---|---|
| *G06F 7/04* | (2006.01) | |
| *G06F 8/73* | (2018.01) | |
| *G06F 21/54* | (2013.01) | |
| *G06F 21/55* | (2013.01) | |

(52) U.S. Cl.
CPC .............. *G06F 21/54* (2013.01); *G06F 8/73* (2013.01); *G06F 21/554* (2013.01); *G06F 21/556* (2013.01)

(58) Field of Classification Search
CPC ........ G06F 21/125; G06F 21/14; G06F 21/50; G06F 21/563; G06F 21/57; G06F 21/577; G06F 21/54; G06F 8/73; G06F 21/554; G06F 21/556
See application file for complete search history.

(56) References Cited

U.S. PATENT DOCUMENTS

| | | | |
|---|---|---|---|
| 8,510,596 B1 | 8/2013 | Gupta et al. | |
| 9,110,675 B1* | 8/2015 | Gschwind | G06F 8/441 |
| 10,079,841 B2 | 9/2018 | Gupta et al. | |
| 11,301,357 B1* | 4/2022 | Gacek | G06F 11/323 |

(Continued)

FOREIGN PATENT DOCUMENTS

| | | |
|---|---|---|
| WO | 2022/133474 A1 | 6/2022 |
| WO | 2022/246437 A1 | 11/2022 |

OTHER PUBLICATIONS

Berger et al, Extracting and Analyzing the Implemented Security Architecture of Business Applications, May 8, 2013, IEEE, pp. 285-294. (Year: 2013).*

(Continued)

*Primary Examiner* — Philip J Chea
*Assistant Examiner* — Jenise E Jackson
(74) *Attorney, Agent, or Firm* — Hamilton, Brook, Smith & Reynolds, P.C.

(57) ABSTRACT

Embodiments detect security vulnerabilities, e.g., backdoors, in applications. An embodiment reverses object code of a computer application to generate source code of the computer application. In turn, the generated source code is compared to trusted source code of the computer application to detect a security vulnerability in the object code of the computer application. Embodiments can take one or more protection actions, e.g., sending a notification or preventing execution of the object code, amongst other examples, in response to detecting the security vulnerability.

14 Claims, 6 Drawing Sheets

(56) References Cited

U.S. PATENT DOCUMENTS

| | | | |
|---|---|---|---|
| 2008/0288919 A1* | 11/2008 | Hodges | G06F 8/423 |
| | | | 717/106 |
| 2012/0311535 A1* | 12/2012 | Fanning | G06F 11/3604 |
| | | | 717/123 |
| 2013/0185798 A1 | 7/2013 | Saunders et al. | |
| 2015/0244737 A1* | 8/2015 | Siman | G06F 21/51 |
| | | | 726/23 |
| 2016/0224793 A1* | 8/2016 | Lu | G06F 11/3604 |
| 2017/0169223 A1 | 6/2017 | Lin et al. | |
| 2018/0157843 A1* | 6/2018 | McDuff | G06F 21/577 |
| 2019/0265955 A1* | 8/2019 | Wolf | G06F 11/36 |
| 2020/0104490 A1* | 4/2020 | Boulton | G06F 21/563 |
| 2020/0364344 A1* | 11/2020 | Liu | G06F 21/577 |
| 2020/0394588 A1* | 12/2020 | Sanchez | G06F 8/75 |
| 2022/0012335 A1* | 1/2022 | Hicks | G06F 21/563 |
| 2022/0391506 A1 | 12/2022 | Gupta | |
| 2023/0252150 A1* | 8/2023 | Shimada | G06F 21/54 |
| | | | 726/23 |

OTHER PUBLICATIONS

Sun et al, PyXhon: Dynamic Detection of Security Vulnerabilities in Python Extensions, May 25, 2012, IEEE, pp. 461-466. (Year: 2012).*

International Search Report and Written Opinion received for PCT Patent Application No. PCT/US2021/072967, mailed on Apr. 14, 2022, 12 pages.

Stamos, Alex, Becoming Secure by Design With SolarWinds, SolarWinds Worldwide LLC, 2021. 9 pages.

WinMerge, "What is WinMerge?", Avaialbe online at <https://winmerge.org/?lang=en[>, Retrieved from Feb. 2, 2022, 3 pages.

* cited by examiner

SOFTWARE BUILD SYSTEM PROTECTION ENGINE

RELATED APPLICATION

This application claims the benefit of U.S. Provisional Application No. 63/126,515, filed on Dec. 16, 2020.

The entire teachings of the above application are incorporated herein by reference.

BACKGROUND

With each passing day, cyber-attacks are becoming increasingly sophisticated. Attacks are often targeted to exploit specific vulnerabilities in specific applications. Various methods and tools exist for identifying these vulnerabilities in applications, but these existing methods and tools are inadequate.

SUMMARY

Embodiments provide methods, systems, and computer program products to detect security vulnerabilities in computer applications. Amongst other example implementations, embodiments can detect vulnerabilities in computer application object code.

An example embodiment is directed to a computer-implemented method for detecting a security vulnerability in an application. The method, first, reverses object code of a computer application to generate source code of the computer application. In turn, the method compares the generated source code to trusted source code of the computer application to detect a security vulnerability in the object code of the computer application.

According to an embodiment, the comparing identifies a difference between the generated source code and the trusted source code and, in response to identifying the difference, determines the object code of the computer application includes the security vulnerability. In an example implementation, identifying a difference includes (i) determining exported and imported addresses from the generated source code and (ii) determining exported and imported addresses from the trusted source code. To continue, a difference is identified between (i) the exported and imported addresses determined from the generated source code and (ii) the exported and imported addresses determined from the trusted source code.

To identify a difference, another embodiment executes the generated source code to identify resource handles associated with the generated source code and executes the trusted source code to identify resource handles associated with the trusted source code. A difference is then identified between (i) the identified resource handles associated with the generated source code and (ii) the identified resource handles associated with the trusted source code.

In an embodiment the object code is in a machine code or bytecode format. According to another embodiment, the object code includes symbol data. Such an embodiment may generate the object code including the symbol data by: (i) compiling evaluation source code of the computer application and (ii) prior to completing the compiling, saving the object code including the symbol data.

Yet another embodiment processes the object code to identify a code type of the computer application and selects a decompiler to perform the reversing based upon the identified code type.

According to an embodiment, the security vulnerability is a backdoor.

Embodiments may take any desired protection action or multiple protection actions in response to detecting the security vulnerability. For instance, an embodiment sends a notification of the vulnerability to a user in response to detecting the security vulnerability. Another embodiment prevents execution of the object code in response to detecting the security vulnerability.

Yet another embodiment compares the generated source code to the trusted source code using multiple computer devices, e.g., separate and distinct machines. Such an embodiment compiles the generated source code using a first computing device to create first object code of the computer application and compiles the trusted source code using a second computing device to create second object code of the computer application. In turn, the created first object code of the computer application and the created second object code of the computer application are compared to detect the security vulnerability.

Another embodiment is directed to a computer system for detecting a security vulnerability in an application. The system includes a processor and a memory with computer code instructions stored thereon that cause the system to detect security vulnerabilities as described herein. In one such embodiment, the system is configured to first, reverse object code of a computer application to generate source code of the computer application and, second, compare the generated source code to trusted source code of the computer application to detect a security vulnerability in the object code of the computer application.

Yet another embodiment is directed to a computer program product for detecting security vulnerabilities in applications. The computer program product comprises one or more non-transitory computer-readable storage devices and program instructions stored on at least one of the one or more storage devices. The program instructions, when loaded and executed by a processor, cause an apparatus associated with the processor to detect security vulnerabilities as described herein.

In an example embodiment, the program instructions cause an apparatus to reverse object code of a computer application to generate source code of the computer application. The program instructions then cause the apparatus to compare the generated source code to trusted source code of the computer application so as to detect a security vulnerability in the object code of the computer application.

It is noted that embodiments of the method, system, and computer program product may be configured to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
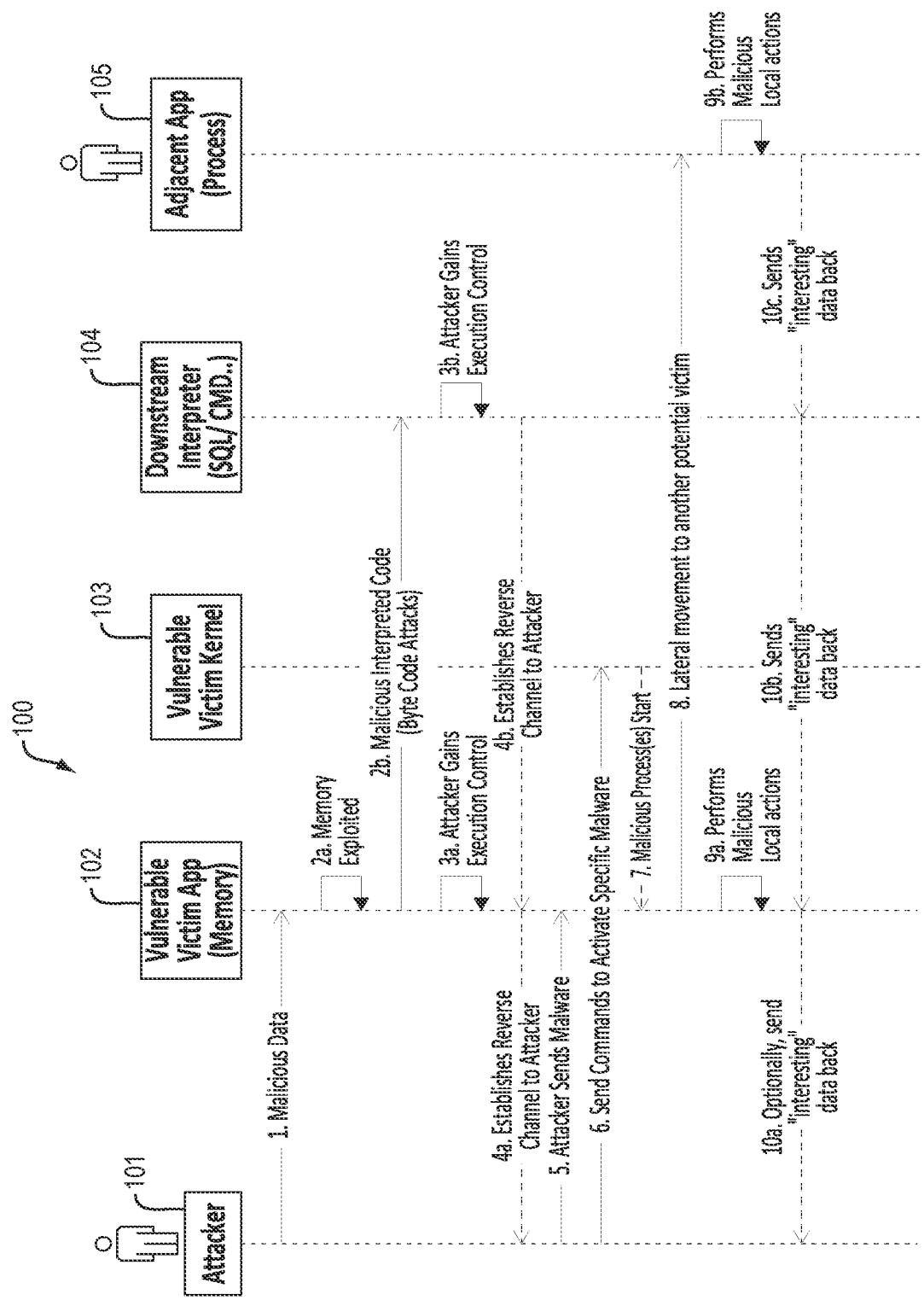
FIG. 1 is a sequence diagram illustrating a methodology for gaining persistence via a workload vulnerability.

A description of example embodiments follows. Embodiments provide improved functionality to detect security vulnerabilities, e.g., backdoors, in applications.

Software vendors are faced with the very serious problem of determining if a bad actor has surreptitiously built a backdoor into their product. A backdoor establishes a two-way communication channel from the end-user's compute instance to an attacker's command control center, e.g., computing device. Using this communication channel, an attacker gets full control over the victim's compute instance and can perform a battery of malicious events on the victim machine. Amongst other examples, malicious activities that can be performed by such attackers include uploading confidential material to the attacker's compute instance, encrypting files, setting up administrative accounts, and disabling services.

A backdoor in a popular software solution can cause a very large number of end-users to get infected in one fell swoop. Software is routinely distributed and updated from a centralized location. If the backdoor can be blended into the software vendor's code, then the process of installing or updating code can cause the embedded malware to run. The end-user has no means to distinguish genuine vendor code from attacker compromised code. This process is made even more troublesome if the malware has, inadvertently, been digitally "signed" by the software vendor.

Such vulnerabilities are also problematic because attackers have multiple touch points or opportunities to insert one or more backdoors into a software vendor's code. In most scenarios, the attacker starts off by gaining persistent access to a software developer's compute instance or the build system or both. Then, by leveraging the two-way communication channel between the attacker's compute instance and the victim's compute instance, the attacker can drop new code, objects, or executables into the code. Once the code gets signed, the malicious code becomes "legitimate" or "blessed" by the software vendor's digital certificate.

The first opportunity (Type 1 Attack) involves inserting malicious source code directly into the software vendor's source code itself. In this scenario, the attacker can read and write code produced by the developer and familiarize themselves with the build processes. A clever attacker can then a use a coding style like that of the victim (one or more targeted software developer) and either modify existing source code or append new files into the software vendor's source code. In this Type 1 Attack, the attacker's goal is to ensure that the newly added malicious source code does not get detected by either the software developer, a peer reviewing the victim's code, one or more automated static code analysis tools, or any other code checking functionality. The Type 1 Attack mode of inserting a backdoor is the most efficient from the attacker's point of view as there is no easy way to detect that the malicious activity took place or not.

A second opportunity (Type 2 Attack) for the attacker involves inserting a precompiled object into a compute instance that builds the software vendor's code. By dropping malicious pre-compiled objects into the one or more build machines, the attacker gets a shot at adding malware into the vendor's otherwise pristine code. In most cases, the build system starts out by wiping all files from the one or many build directories. This step is followed by checking out code from the enterprise repository. Next, the actual compiling and linking activity subsumed in the build script(s) get activated. Because compiling and linking occur within close succession, for the attacker to be successful, the attacker inserts their malicious precompiled objects in the open window of opportunity. This relatively small window of opportunity makes this approach a little harder. Also, someone parsing the build logs could detect the attack and, therefore, the attacker's footprint may get detected before damage is done.

A third opportunity (Type 3 Attack) for the attacker involves inserting one or more compiled and linked binary codes into the one or more build systems. An unsuspecting build script may not notice the insertion of the executable backdoor and proceed with digitally signing the new build/update. Since executable generation and signing are back-to-back operations, the attacker makes sure their backdoor is ready and waiting. This window of opportunity is also relatively small; therefore, the attacker must be nimble.

A fourth opportunity for the attacker exists wherein the attacker can hardcode access credentials into the code. This kind of backdoor is easily detected using automated code analysis tools like software application security test (SAST) tools.

Figure 2:
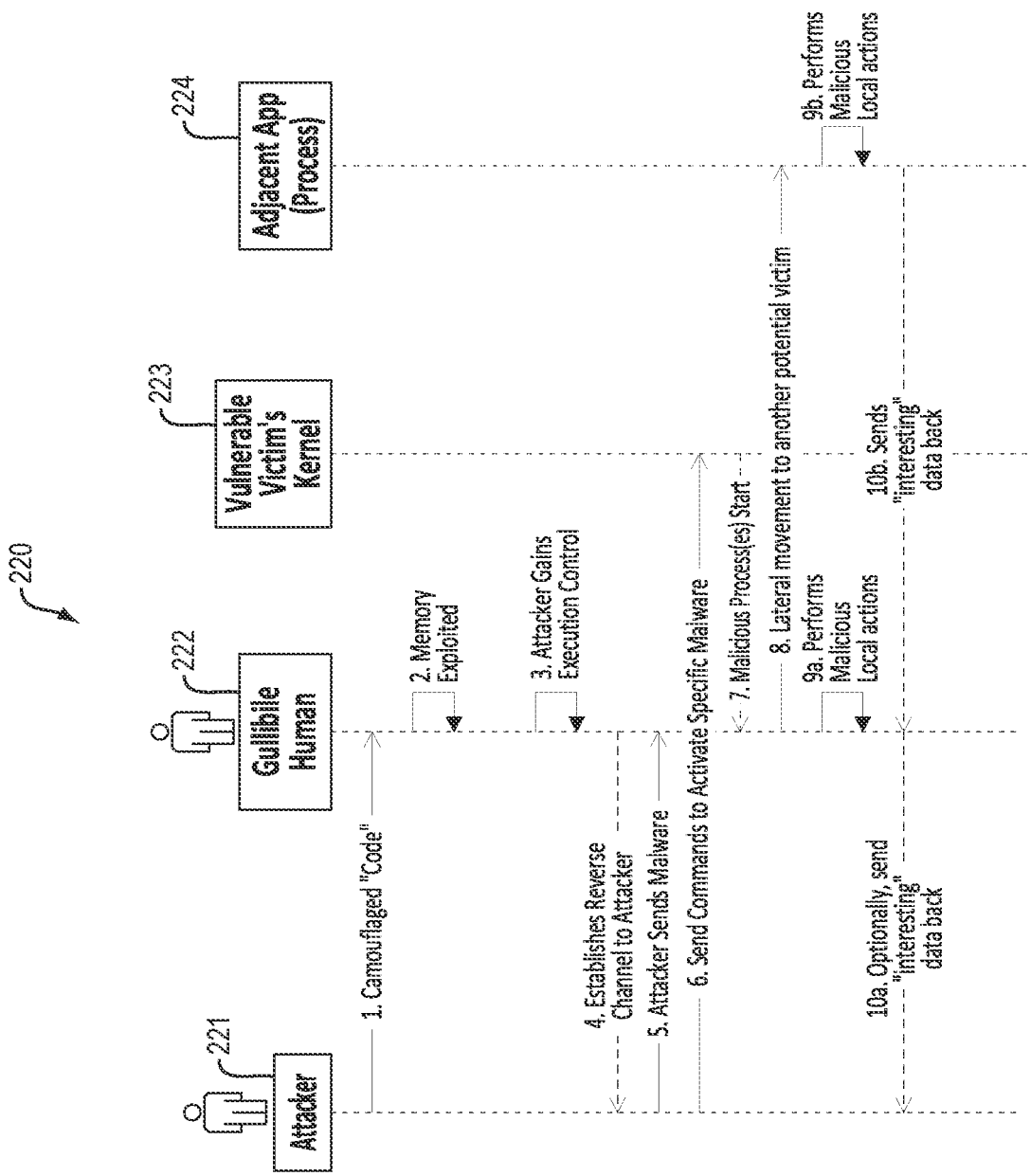
FIG. 2 is a sequence diagram illustrating a methodology for gaining persistence via a user.

Embodiments identify backdoors in code. There are a plurality of ways to install such backdoors. Generally, the attacker gains execution control, gains persistent access to a software developer's compute instance or the build system or both, and then installs malware. Since the attacker has execution control, the attacker can then activate the recently installed malware. As such, once the attacker achieves execution control the attacker can take any desired action, e.g., establishing persistence. FIGS. 1 and 2 described hereinbelow illustrate example actions, amongst others, that may be taken by attackers. However, it is noted that embodiments are not limited to identifying backdoors implemented using the methodologies described in relation to FIGS. 1 and 2 and, instead, embodiments can be used to identify any vulnerabilities, e.g., backdoors, in code, regardless of how those backdoors are implemented.

FIG. 1 is a sequence diagram illustrating a methodology 100 for gaining persistence via a server/workload vulnerability. In the methodology 100, at step 1, the attacker 101 sends malicious data to the vulnerable victim application memory 102. The malicious data is in turn exploited at step 2a. At step 2b, malicious interpreted codes, e.g., byte code attacks, are sent to the downstream interpreter 104. This allows the attacker 101 to gain execution control of the victim application 102 at step 3a and allows the attacker 101 to gain execution control of the downstream interpreter 104 at step 3b. The control obtained at step 3a allows the attacker 101, at step 4a, to establish a persistent access channel between the victim 102 and attacker 101. Likewise, the control obtained at step 3b allows the attacker 101, at step 4b, to establish a persistent access channel between the downstream interpreter 104 and attacker 101. The established channels (steps 4a and 4b) allow the attacker 101 to send malware to the vulnerable application 102 (step 5) and send commands to activate malware (e.g., the malware sent at step 5) to the vulnerable victim kernel 103. The commands activating the malware (step 6) cause the kernel 103 to start the malicious processes on the victim application 102

(step 7). The attacker 101 can also move to other applications, e.g., 105, at step 8. This activity allows the attacker 101 to perform malicious local actions on the application 102 and application 105, steps 9a and 9b respectively. Amongst other actions, the malicious actions (steps 9a and 9b) allow the attacker 101 to send data from the vulnerable application 102 (step 10a), downstream interpreter 104 (step 10b), and adjacent application 105 (step 10c).

The attacker 101 uses the kill chain methodology 100 to achieve persistence. This is done by exploiting a vulnerability in a binary code or a byte code application (where a downstream interpreter 104 is attacked). In particular, in the methodology 100 the attacker 101 gains persistence (step 4a and/or step 4b) by exploiting a vulnerability in either a byte code (step 3b) based vulnerable application 102, or a binary code (step 3a) based vulnerable application 102.

FIG. 2 is a sequence diagram illustrating a methodology 220 for gaining persistence via an attack on a personal endpoint, e.g., a user. Unlike a server or workload compute instance, attacking a personal endpoint requires a two-step operation. First, the attacker 221 targets a gullible human victim 222. Second, the gullible victim 222 is persuaded to click on the malware so that the malware contents can be executed. Such persuasion is often achieved by convincing the human that the incoming content is from a trusted source.

To achieve persistence in this scenario 220, at step 1 the attacker 221 sends camouflaged code, such as a hyperlink that automatically downloads malware, a malicious PDF, JPG, Office document via apps that exchange files (such as email, FTP, SSH, HTTP, SMB, NFS, NETBIOS, CIFS, etc.) or via removable media (such as USB sticks, removable drives, etc.), to a gullible human 222 (step 1). Upon implementing the camouflaged code (e.g., the gullible human 222 clicking a link, opening a file in which malware is embedded, or inserting removable media, etc.) the underlying malware gets activated (step 2). Activating the malware, i.e., exploiting the memory at step 2 allows the attacker 221, at step 3, to gain execution control of the human's 222 computing endpoint. Through this control the attacker establishes a reverse channel (step 4). Through this reverse channel the attacker 221 can send additional malware (step 5) and send commands (step 6) to the vulnerable victim's kernel 223 to activate specific malware. This causes the kernel 223 to start the malicious processes of the attacker's 221 choosing (step 7). The attacker 221 can also move to other applications, e.g., 224, at step 8. The method 220 allows the attacker 221 to perform malicious local actions on the gullible human's 222 computing device (step 9a) and on adjacent applications 224 (step 9b). Amongst other actions, the malicious actions (steps 9a and 9b) allow the attacker 221 to send data from the human's 222 device (step 10a) and adjacent application 224 (step 10b) back to the attacker 221.

Figure 3:
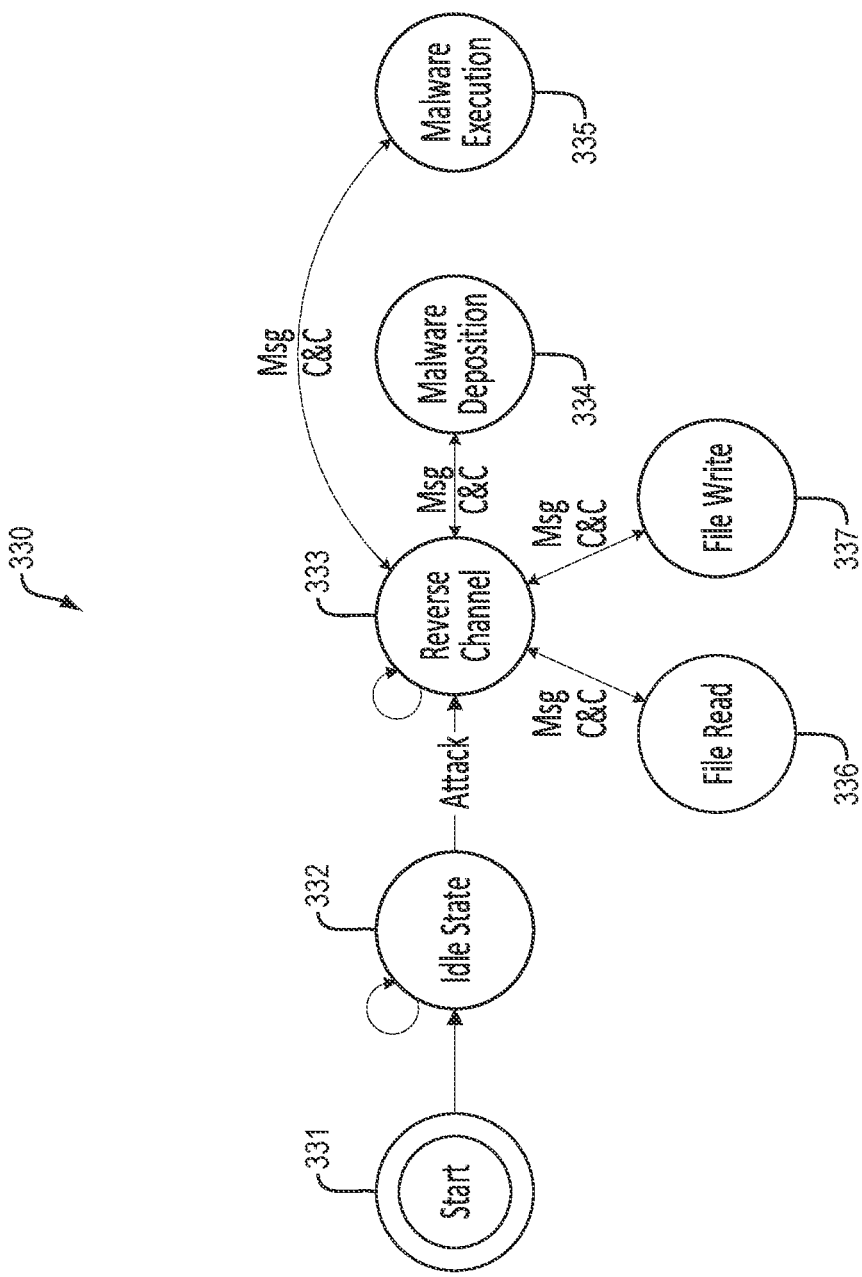
FIG. 3 illustrates an example state machine for manipulating a computing instance.

Once the attacker has achieved persistence on a developer's endpoint via either the server vulnerability-based attack 100 described hereinabove in relation to FIG. 1 or a personal endpoint-based attack 220 described hereinabove in relation to FIG. 2, the attacker can access critical code files on either the developer's compute instance or the build system using the process illustrated in the example state machine 330 illustrated in FIG. 3.

The state machine 330 begins in a start state 331 and moves to an idle state 332. From the idle state 332, a reverse channel is established and the state machine moves to the reverse channel state 333. From the reverse channel state 333, an attacker can deposit malware, state 334, and execute the malware, state 335. In this way, by following the state machine 330 an attacker can install a backdoor into benign code. The malware execution state 335 allows an attacker to enter the read file state 336, where files can be read from an application and/or vulnerable computing device. Similarly, the malware execution state 335 allows an attacker to enter the file write state 337 where files can be written to compromised memory.

Functionality exists to detect memory exploitation and block malicious processes. For instance, through use of Applicant's application aware workload protection technology, examples of which are described in U.S. Pat. Nos. 10,079,841 and 8,510,596, it is possible to prevent an attacker from being able to achieve persistence in a server, developer endpoint compute instance, and build server. Further, Applicant's Application Control, described in Provisional Application No. 63/190,099 filed May 18, 2021, technology prevents unrecognized malicious processes from starting up. This prevents the attacker from starting up utilities that are important to the propagation of the attack, such as RATS, FTP, encryption, compression utilities to facilitate their attacks.

Once an attacker has achieved persistence using the methods 100 or 220 described hereinabove in relation to FIG. 1 and FIG. 2, the attacker can install a backdoor using the techniques described hereinabove, e.g., Type 1 attack, Type 2 Attack, and Type 3 Attack. Embodiments are directed to methods and systems to protect against the backdoor by identifying the existence of the backdoor in code.

Figure 4:
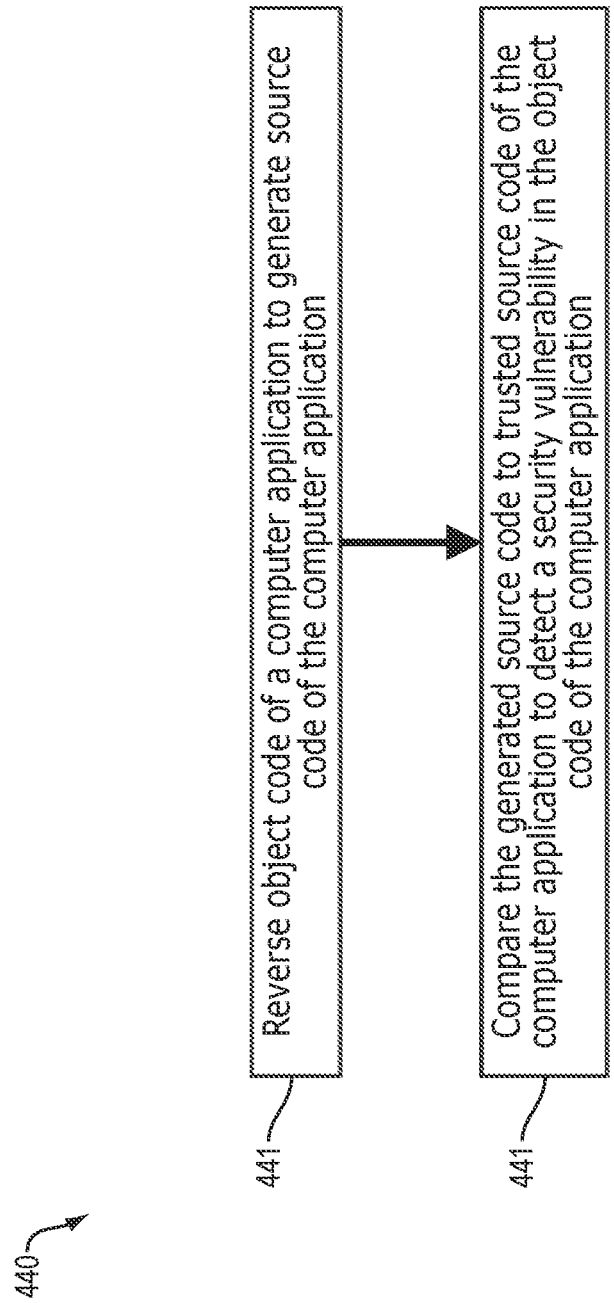
FIG. 4 is a flow diagram of a method for detecting a security vulnerability in an application according to an embodiment.

FIG. 4 is a flow diagram of a method 440 for detecting a security vulnerability, e.g., a backdoor, in an application according to an embodiment. The method 440 is computer implemented and, as such, may be implemented using any computing device, or combination of computing devices known in the art. Further, the method 440 may be implemented as part of a continuous integration continuous deployment (CICD) pipeline.

The method 440 starts at 441 and reverses, e.g., decompiles, object code of a computer application to generate source code of the computer application. In an embodiment, the object code is in a machine code or bytecode format. An embodiment of the method 440 processes the object code to identify a code type of the computer application and selects a decompiler to perform the reversing at 441 based upon the identified code type.

In an embodiment of the method 440, the object code is reversed using techniques known in the art. Another embodiment implements a new and unique methodology to create the object code that is reversed at 441. Specifically, most object code is stripped of symbol data. However, in an embodiment of the method 440, the object code that is reversed at step 441 is particularly created to include such symbol data. Such an embodiment of the method 440 generates the object code including the symbol data by compiling evaluation source code of the computer application, i.e., source code of the application that is being examined to detect a security vulnerability. In this implementation, prior to completing the compiling, the method 440 saves the object code including the symbol data. In turn, this embodiment reverses the object code including the symbol data at step 441.

Returning to FIG. 4, at 442, the method compares the generated source code to trusted source code of the computer application to detect a security vulnerability in the object code of the computer application. An embodiment may use a known technique, such the differencing functionality described at https://winmerge.org/?lang=en.

In an embodiment, the trusted source code is source code known to be vulnerability free. As such, if the generated source code and trusted source code are different, the object code is determined to be compromised and include a security vulnerability. In an embodiment, the comparing at 442, determines if the generated source code and trusted source code are functionality equivalent and if the generated source code and trusted source are not functionality equivalent, the object code is considered to include a vulnerability. The determination of functional equivalence may ignore, or disregard, differences between the generated source code and trusted source code that cause no functional change, e.g., variable names. To implement this functional comparison, before the comparison, an embodiment may normalize the generated source code and trusted source code. This normalization, for example, may include normalizing variable names between the generated source code and trusted source code. One such embodiment uses a Regex mechanism to pre-process and normalize the generated source code and trusted source code before performing the comparison.

The trusted source code may be provided by a software vendor or user implementing the method 440, amongst other examples. An embodiment of the method 440, at step 442, compares one or more particular sections of the generated source code and trusted source code to detect the security vulnerability. For instance, an example embodiment of the method 440, at step 442, compares the text sections of the generated source code and trusted source code. Yet another embodiment, at step 442, compares the resource sections of the generated source code and trusted source code. Such an embodiment may determine the text sections and/or resource sections of the generated and trusted source codes are different and, thereby, the object code includes a security vulnerability.

According to an embodiment, the comparing 442 identifies a difference between the generated source code and the trusted source code and, in response to identifying the difference, determines the object code of the computer application includes the security vulnerability. According to an embodiment, the identified difference is any difference that can affect functionality. In an example implementation, identifying a difference includes determining (i) exported and imported addresses from the generated source code and (ii) exported and imported addresses from the trusted source code. To continue, a difference is identified between (i) the exported and imported addresses determined from the generated source code and (ii) the exported and imported addresses determined from the trusted source code.

To identify a difference, another embodiment of the method 442 executes the generated source code to identify resource handles associated with the generated source code and executes the trusted source code to identify resource handles associated with the trusted source code. A difference is then identified between (i) the identified resource handles associated with the generated source code and (ii) the identified resource handles associated with the trusted source code.

Yet another embodiment of the method 440 performs the comparing using multiple computer devices, e.g., separate and distinct machines. To perform the comparing, such an embodiment compiles the generated source code using a first computing device to create first object code of the computer application and compiles the trusted source code using a second computing device to create second object code of the computer application. In turn, the created first object code of the computer application and the created second object code of the computer application are compared to detect the security vulnerability.

According to an embodiment of the method 440, the security vulnerability detected at 442 is a backdoor.

The method 440 may take any number of desired protection action in response to detecting the security vulnerability at 442. For instance, one such embodiment sends a notification. Another embodiment prevents execution of the object code in response to detecting the security vulnerability.

The method 440 implements a decompilation based approach to detect Type 1, Type 2, and Type 3 attacks. When the attacker drops a source code-based malware, it is ordinarily very difficult to distinguish benign code from the malicious code because both pieces have undergone transformation into byte or machine code (object code) which is not readable by humans.

To address this problem, the machine code or byte code of the current and previous build can be decompiled so that code is readable by a human. Then the two human readable copies of the code can be compared. A developer and a peer can review the differences and ensure that the difference is consistent with the changes they personally made to the code. Any malware injected by the bad actor can be quickly identified.

An embodiment uses an import and export address matching based approach to detect Type 1, Type 2, and Type 3 attacks. Such an embodiment starts by extracting exported and imported addresses from each binary and byte code archive/assembly. The two (import and export) symbol tables are then diffed. The changes are then rationalized and examined by the original developer and a peer.

Embodiments can also implement a dynamic approach to detect the Type 1, Type 2, and Type 3 Attacks. In one such implementation, as a newly released application is executed, handles to resources such as files (code, config, log, etc.), sockets (IP, raw, UNIX), fifos, pipes, shared memory etc., held by the process are extracted for the current and immediately preceding version of the code. The resources used are then diffed, e.g., by a developer and a peer, to determine if there are any differences between the two versions of the code.

If any of the checks described herein do not pass, the build is declared as being unacceptable due to the presence of unintended code. In response, protective actions can be taken.

Embodiments have numerous advantages compared to existing functionality. For instance, because embodiments turn the byte or binary code from a black box into a white box, it is possible to make various granular comparisons and detect the presence of alien code. Embodiments also prevent malicious processes from starting up and ensure processes execute their control flow. Any attempt to execute attacker provided code in the context of a process will be immediately recognized and the threads participating in such subterfuge will get suspended or aborted.

Moreover, the reversing, i.e., decompilation process, implemented by embodiments allows static code analysis to be run even on third party applications. Further, by creating a runtime resource utilization profile, e.g., identifying resources used by the code being compared, embodiments can impose a "jail" wherein any unauthorized usage of resources is flagged and immediately responded to.

Figure 5:
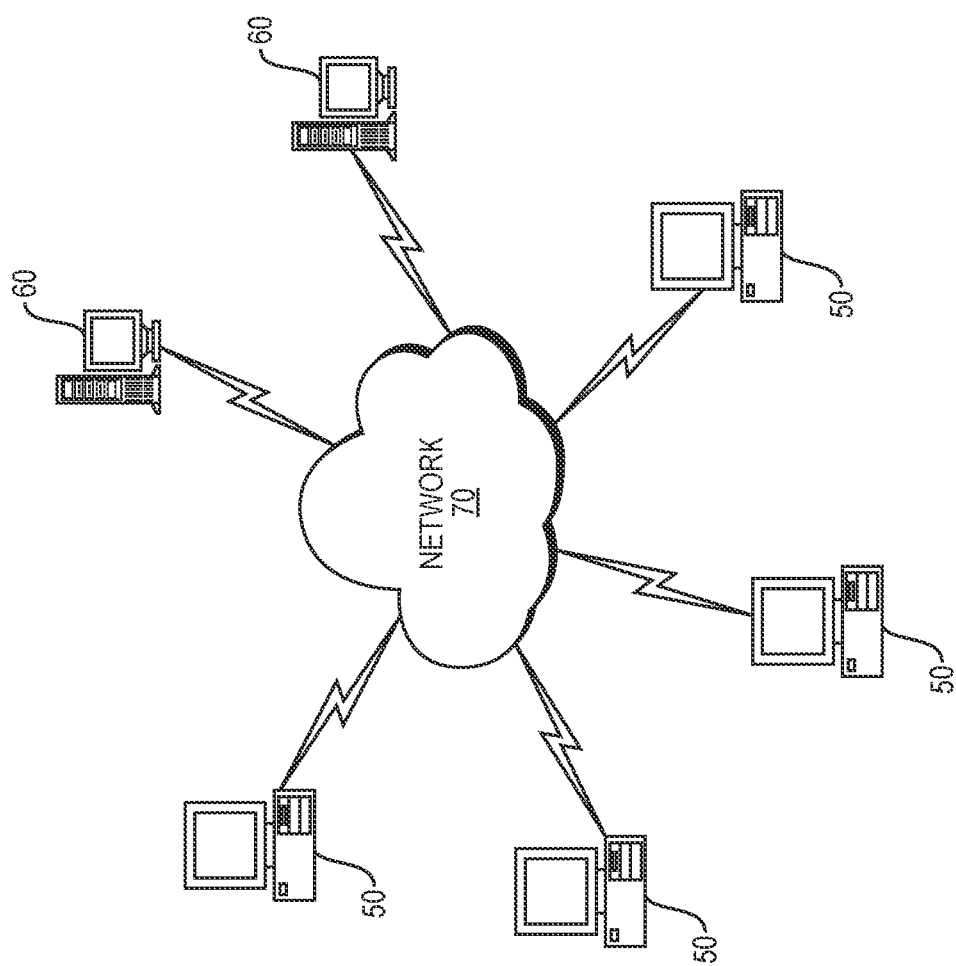
FIG. 5 illustrates a computer network or similar digital processing environment in which embodiments may be implemented.

FIG. 5 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 and/or servers 60 may be configured, alone or in combination, to implement the embodiments described herein, e.g., the method 440, amongst other examples. The server computers 60 may not be separate server computers but part of cloud network 70.

Figure 6:
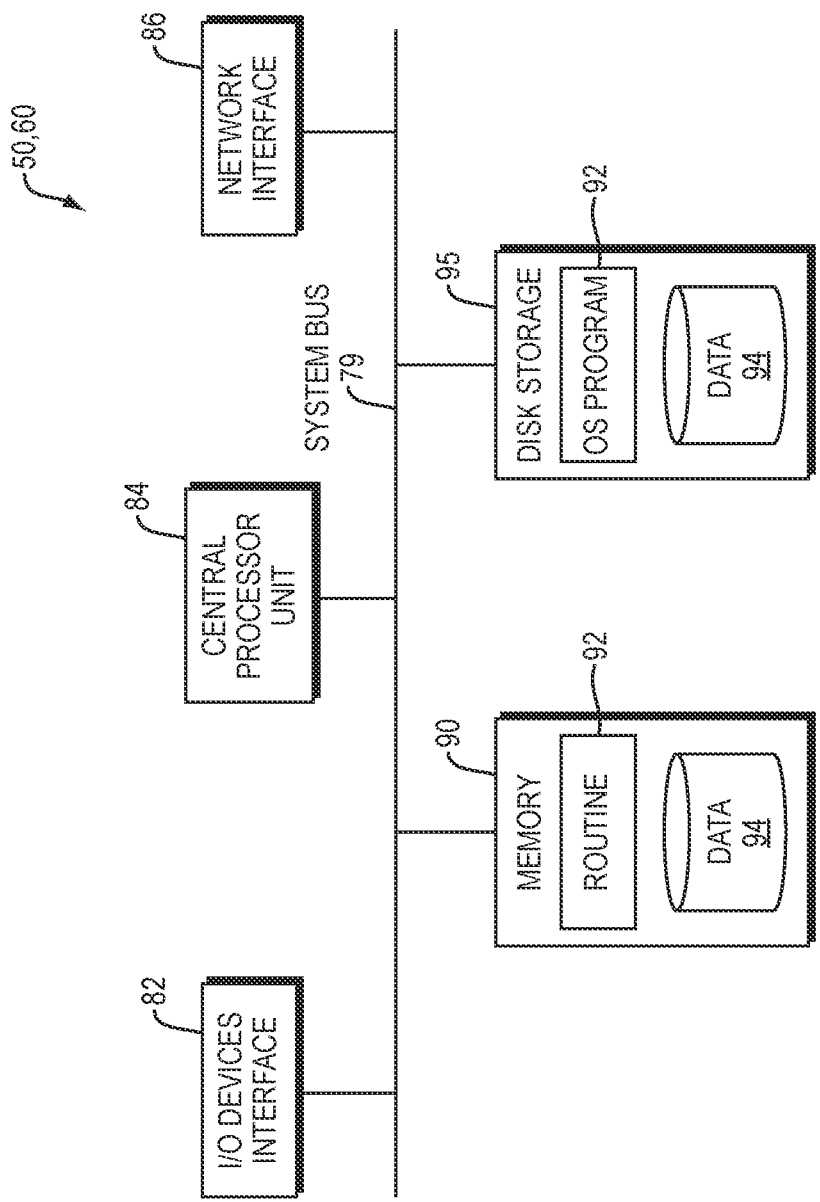
FIG. 6 is a diagram illustrating an example internal structure of a computer in the environment of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an input/output (I/O) device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present disclosure (e.g., the method 440, amongst others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for detecting a security vulnerability in an application, the method comprising:
reversing object code of a computer application to generate source code of the computer application;
comparing the generated source code to trusted source code of the computer application to identify a difference between the generated source code and the trusted source code, wherein identifying the difference comprises at least one of:
(i) determining exported and imported addresses from the generated source code, determining exported and imported addresses from the trusted source code, and identifying a difference between (a) the exported and imported addresses determined from the generated source code and (b) the exported and imported addresses determined from the trusted source code; and
(ii) executing the generated source code to identify resource handles associated with the generated source code, executing the trusted source code to identify resource handles associated with the trusted source code, and identifying a difference between (a) the identified resource handles associated with the generated source code and (b) the identified resource handles associated with the trusted source code; and
in response to identifying the difference, determining the object code of the computer application includes a security vulnerability.

2. The method of claim 1 wherein the object code includes symbol data.

3. The method of claim 2 further comprising:
generating the object code including the symbol data by:
(i) compiling evaluation source code of the computer application and (ii) prior to completing the compiling, saving the object code including the symbol data.

4. The method of claim 1 wherein the object code is in a machine code or bytecode format.

5. The method of claim 1 further comprising:
processing the object code to identify a code type of the computer application; and
selecting a decompiler to perform the reversing based upon the identified code type.

6. The method of claim 1 wherein the security vulnerability is a backdoor.

7. The method of claim 1 further comprising, in response to determining the object code of the computer application includes the security vulnerability, performing at least one of:
sending a notification; and
preventing execution of the object code.

8. The method of claim 1 wherein comparing the generated source code to the trusted source code comprises:

compiling the generated source code using a first computing device to create first object code of the computer application;

compiling the trusted source code using a second computing device to create second object code of the computer application; and comparing the created first object code of the computer application to the created second object code of the computer application to detect the security vulnerability.

9. A system for detecting a security vulnerability in an application, the system comprising:

a processor; and a memory with computer code instructions stored thereon, the processor and the memory, with the computer code instructions, being configured to cause the system to:

reverse object code of a computer application to generate source code of the computer application;

compare the generated source code to trusted source code of the computer application to identify a difference between the generated source code and the trusted source code, wherein identifying the difference comprises at least one of:

(i) determining exported and imported addresses from the generated source code, determining exported and imported addresses from the trusted source code, and identifying a difference between (a) the exported and imported addresses determined from the generated source code and (b) the exported and imported addresses determined from the trusted source code; and (ii) executing the generated source code to identify resource handles associated with the generated source code, executing the trusted source code to identify resource handles associated with the trusted source code, and identifying a difference between (a) the identified resource handles associated with the generated source code and (b) the identified resource handles associated with the trusted source code; and in response to identifying the difference, determining the object code of the computer application includes a security vulnerability.

10. The system of claim 9 wherein the object code includes symbol data and, the processor and the memory, with the computer code instructions, are configured to cause the system to:

generate the object code including the symbol data by: (i) compiling evaluation source code of the computer application and (ii) prior to completing the compiling, saving the object code including the symbol data.

11. The system of claim 9 wherein the processor and the memory, with the computer code instructions, are further configured to cause the system to:

process the object code to identify a code type of the computer application; and select a decompiler to perform the reversing based upon the identified code type.

12. The system of claim 9 wherein the security vulnerability is a backdoor.

13. The system of claim 9 wherein the processor and the memory, with the computer code instructions, are further configured to cause the system to, in response to determining the object code of the computer application includes the security vulnerability, perform at least one of:

sending a notification; and preventing execution of the object code.

14. A computer program product for detecting a security vulnerability in an application, the computer program product comprising:

one or more non-transitory computer-readable storage devices and program instructions stored on at least one of the one or more storage devices, the program instructions, when loaded and executed by a processor, cause an apparatus associated with the processor to:

reverse object code of a computer application to generate source code of the computer application;

compare the generated source code to trusted source code of the computer application to identify a difference between the generated source code and the trusted source code, wherein identifying the difference comprises at least one of:

(i) determining exported and imported addresses from the generated source code, determining exported and imported addresses from the trusted source code, and identifying a difference between (a) the exported and imported addresses determined from the generated source code and (b) the exported and imported addresses determined from the trusted source code; and (ii) executing the generated source code to identify resource handles associated with the generated source code, executing the trusted source code to identify resource handles associated with the trusted source code, and identifying a difference between (a) the identified resource handles associated with the generated source code and (b) the identified resource handles associated with the trusted source code; and in response to identifying the difference, determining the object code of the computer application includes a security vulnerability.

* * * * *